US012561935B2

(12) United States Patent
Clin et al.

(10) Patent No.: US 12,561,935 B2
(45) Date of Patent: Feb. 24, 2026

(54) IMAGE SEGMENTATION FOR AUTOMATIC DIRECT MEASUREMENT AND SCANNING

(71) Applicant: Trimble Inc., Westminster, CO (US)

(72) Inventors: Guillaume Clin, Christchurch (NZ); Stuart Edward Ralston, Christchurch (NZ); Dylan White, Christchurch (NZ)

(73) Assignee: Trimble Inc., Westminster, CO (US)

( * ) Notice: Subject to any disclaimer, the term of this patent is extended or adjusted under 35 U.S.C. 154(b) by 399 days.

(21) Appl. No.: 18/216,059

(22) Filed: Jun. 29, 2023

(65) Prior Publication Data

US 2025/0005886 A1     Jan. 2, 2025

(51) Int. Cl.
*G06V 10/26*     (2022.01)
*G06T 7/11*     (2017.01)

(52) U.S. Cl.
CPC .............. *G06V 10/267* (2022.01); *G06T 7/11* (2017.01); *G06T 2207/20081* (2013.01)

(58) Field of Classification Search
CPC .... G06V 10/267; G06V 20/50; G06V 10/764; G06T 7/11; G06T 2207/20081; G06T 2207/20104; G06F 2203/04804; G06F 3/04842; G06F 18/2431; G01B 11/022
See application file for complete search history.

(56) References Cited

U.S. PATENT DOCUMENTS

| | | | | |
|---|---|---|---|---|
| 11,620,832 | B2 * | 4/2023 | Volkerink | G06T 7/285 |
| | | | | 382/104 |
| 2010/0034125 | A1 * | 2/2010 | Ralston | H04W 4/02 |
| | | | | 370/310 |

| | | | | |
|---|---|---|---|---|
| 2010/0034426 | A1 * | 2/2010 | Takiguchi | G01C 21/3602 |
| | | | | 382/106 |
| 2020/0160111 | A1 * | 5/2020 | Ling | G06T 7/143 |
| 2020/0326179 | A1 * | 10/2020 | Tong | G01B 11/026 |
| 2021/0061064 | A1 * | 3/2021 | Soni | G01C 21/367 |
| 2021/0110564 | A1 * | 4/2021 | Mantey | G06T 3/40 |
| 2021/0241505 | A1 * | 8/2021 | Dryer | G06T 7/62 |
| 2021/0304465 | A1 * | 9/2021 | Dryer | G06F 3/0304 |
| 2022/0001236 | A1 * | 1/2022 | Mooney | G06F 18/00 |

(Continued)

FOREIGN PATENT DOCUMENTS

| | | | | |
|---|---|---|---|---|
| AU | 2012289973 A1 * | 3/2014 | ......... | A61F 2/30942 |
| AU | 2020 239 675 A1 | 8/2021 | | |

(Continued)

OTHER PUBLICATIONS

Extended European Search Report for Application No. 24182566.0-1207, mailed Nov. 11, 2024, 8 pages.

*Primary Examiner* — Mia M Thomas
(74) *Attorney, Agent, or Firm* — Kilpatrick Townsend & Stockton LLP

(57) ABSTRACT

Measurement devices such as total stations or laser scanners equipped with camera sensors can capture an image of an environment. An image segmentation model can identify and segment environmental features in the image. The measurement device can display an overlay of the segmented features on top of the image. When a user selects a particular feature, the measurement device can perform point measurements such as scanning to measure a portion of the environment associated with the selected feature. Features in the environment not selected by the user may not be included in the point measurements.

17 Claims, 6 Drawing Sheets

(56)         References Cited

U.S. PATENT DOCUMENTS

| | | | | |
|---|---|---|---|---|
| 2022/0375114 A1* | 11/2022 | Hunter | ............. | A61B 1/000094 |
| 2023/0281828 A1* | 9/2023 | Du | ........................ | G06V 10/774 |
| | | | | 382/157 |
| 2023/0360239 A1* | 11/2023 | Lin | ......................... | G06T 7/521 |
| 2024/0005514 A1* | 1/2024 | Kaditz | ................... | A61B 5/055 |
| 2024/0134007 A1* | 4/2024 | Feng | ...................... | G01S 7/412 |
| 2024/0306943 A1* | 9/2024 | Meng | ...................... | A61B 5/11 |
| 2025/0014161 A1* | 1/2025 | Rakha | ................. | G06V 20/176 |
| 2025/0044412 A1* | 2/2025 | Yang | ..................... | G01S 13/885 |
| 2025/0046057 A1* | 2/2025 | Venkataramani | .... | G06V 10/764 |
| 2025/0095864 A1* | 3/2025 | Hanratty | ................ | G16H 30/20 |
| 2025/0130571 A1* | 4/2025 | Parker | ...................... | G06N 3/02 |
| 2025/0130575 A1* | 4/2025 | Parker | .................... | G05D 1/246 |
| 2025/0252719 A1* | 8/2025 | Duchesne | .............. | G06V 10/26 |
| 2025/0278920 A1* | 9/2025 | Raj | ...................... | G06V 10/273 |
| 2025/0316022 A1* | 10/2025 | Babinowich | ............ | G06T 19/00 |

FOREIGN PATENT DOCUMENTS

| | | | | | |
|---|---|---|---|---|---|
| EP | 4485385 A1 * | 1/2025 | .............. | G06T 7/11 |
| WO | WO-2018093755 A1 * | 5/2018 | ................ | B23F 7/11 |

* cited by examiner

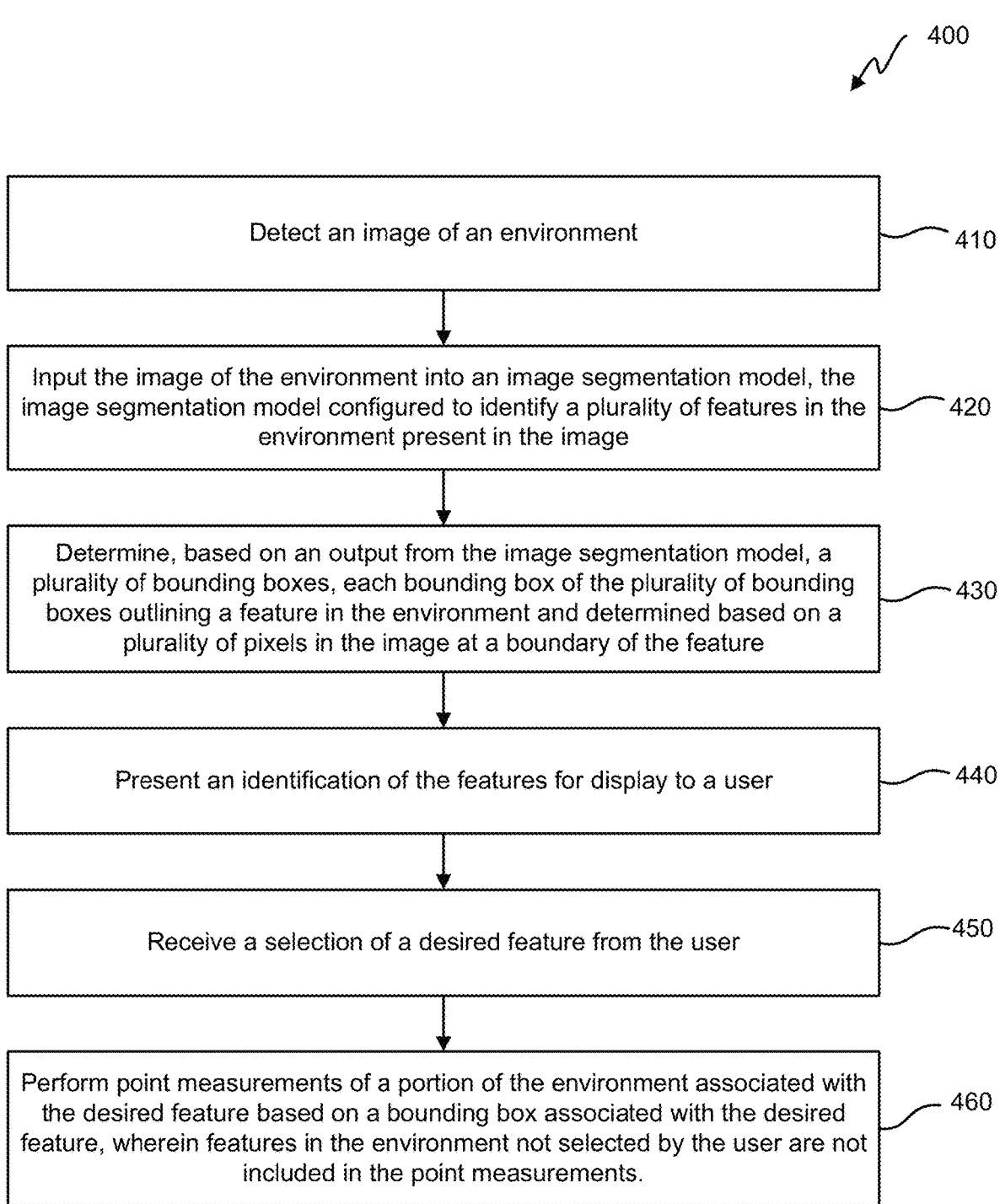

400

Detect an image of an environment — 410

Input the image of the environment into an image segmentation model, the image segmentation model configured to identify a plurality of features in the environment present in the image — 420

Determine, based on an output from the image segmentation model, a plurality of bounding boxes, each bounding box of the plurality of bounding boxes outlining a feature in the environment and determined based on a plurality of pixels in the image at a boundary of the feature — 430

Present an identification of the features for display to a user — 440

Receive a selection of a desired feature from the user — 450

Perform point measurements of a portion of the environment associated with the desired feature based on a bounding box associated with the desired feature, wherein features in the environment not selected by the user are not included in the point measurements. — 460

FIG. 4

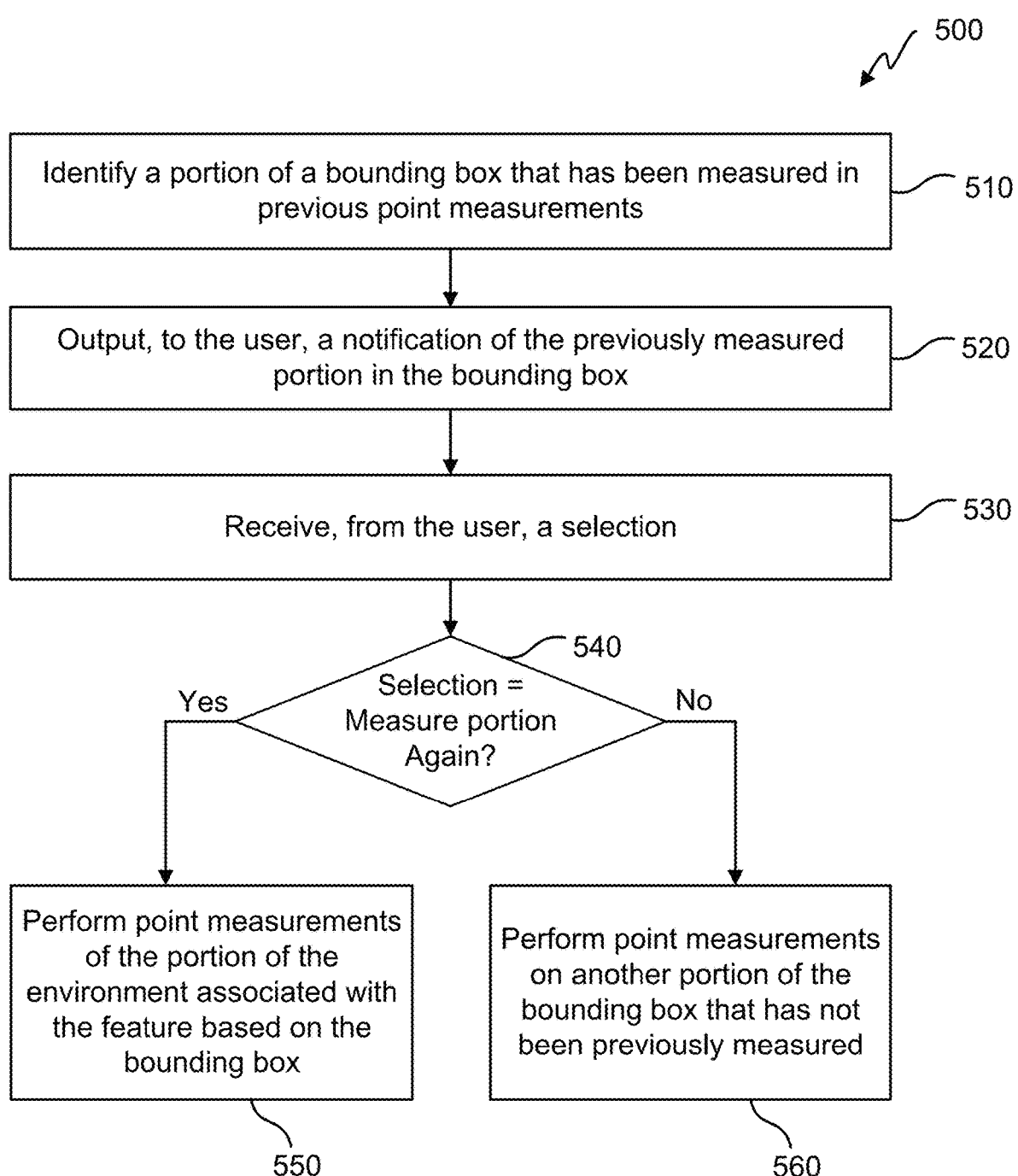

500

Identify a portion of a bounding box that has been measured in previous point measurements — 510

Output, to the user, a notification of the previously measured portion in the bounding box — 520

Receive, from the user, a selection — 530

540

Selection = Measure portion Again?

Yes

No

Perform point measurements of the portion of the environment associated with the feature based on the bounding box

550

Perform point measurements on another portion of the bounding box that has not been previously measured

IMAGE SEGMENTATION FOR AUTOMATIC DIRECT MEASUREMENT AND SCANNING

BACKGROUND

This disclosure relates in general to surveying systems. Surveying determines positions of points relative to each other and/or to the Earth. Surveying can be used in many applications by land surveyors, construction professionals, and civil engineers. Surveying often uses specialized equipment, such as laser levels, surveying rods, total stations, laser scanners, and GNSS (Global Navigation Satellite System) receivers.

SUMMARY

This disclosure relates to image segmentation for automatic direct measurement and scanning performed by measurement devices such as total stations or three-dimensional scanners. A summary of the invention is provided below as a series of examples. As used below, any reference to a series of examples is to be understood as a reference to each of those examples disjunctively (e.g., "Examples 1-4" is to be understood as "Examples 1, 2, 3, or 4").

Example 1 is a method for operating a measurement device, the method comprising: detecting an image of an environment; inputting the image of the environment into an image segmentation model, the image segmentation model configured to identify a plurality of features in the environment present in the image; determining, based on an output from the image segmentation model, a plurality of bounding boxes, each bounding box of the plurality of bounding boxes outlining a feature of the plurality of features in the environment and determined based on a plurality of pixels in the image at a boundary of the feature; presenting an identification of the plurality of features for display to a user; receiving a selection of a desired feature of the plurality of features from the user; performing point measurements of a portion of the environment associated with the desired feature based on a bounding box of the plurality of bounding boxes associated with the desired feature, wherein features in the environment not selected by the user are not included in the point measurements.

Example 2 is the method of example(s) 1, wherein presenting the identification of the plurality of features for display to the user further comprises: presenting, by the measurement device, the image of the environment for display to the user; and presenting, by the measurement device, an overlay of the plurality of bounding boxes over the display of the image of the environment to the user.

Example 3 is the method of example(s) 1-2, wherein receiving the selection of the desired feature further comprises: receiving, by the measurement device, the selection of the bounding box on the overlay from the user.

Example 4 is the method of example(s) 1-3, further comprising: identifying, by the measurement device, a portion of the bounding box that has been measured in previous point measurements; outputting, to the user, a notification of the previously measured portion in the bounding box; receiving, from the user, another selection of the bounding box; and in response to receiving the other selection, performing, by the measurement device, the point measurements of the portion of the environment associated with the feature based on the bounding box.

Example 5 is the method of example(s) 1-4, wherein performing the point measurements of the portion of the environment associated with the desired feature further comprises: identifying, by the measurement device, a resolution associated with a type of the desired feature; determining, by the measurement device, the portion of the environment to measure based on the bounding box; and performing, by the measurement device, the point measurements for the portion of the environment using the resolution.

Example 6 is the method of example(s) 1-5, wherein the portion of the environment comprises a region associated with the desired feature outlined by the bounding box and a buffer region surrounding the desired feature, wherein a thickness of the buffer region is selected by the user.

Example 7 is the method of example(s) 1-6, wherein the image segmentation model is a trained machine learning model.

Example 8 is a measurement device for performing point measurements, the measurement device comprising: one or more memory devices coupled with the measurement device containing instructions that, when executed by one or more processors, perform the following steps: detecting an image of an environment; inputting the image of the environment into an image segmentation model, the image segmentation model configured to identify a plurality of features in the environment present in the image; determining, based on an output from the image segmentation model, a plurality of bounding boxes, each bounding box of the plurality of bounding boxes outlining a feature of the plurality of features in the environment and determined based on a plurality of pixels in the image at a boundary of the feature; presenting an identification of the plurality of features for display to a user; receiving a selection of a desired feature of the plurality of features from the user; and performing point measurement of a portion of the environment associated with the desired feature based on a bounding box of the plurality of bounding boxes associated with the desired feature, wherein features in the environment not selected by the user are not included in the point measurements.

Example 9 is the measurement device of example(s) 8, wherein the instructions further cause the one or more processors to present the identification of the plurality of features for display to the user by: presenting the image of the environment for display to the user; and presenting an overlay of the plurality of bounding boxes over the display of the image of the environment to the user.

Example 10 is the measurement device of example(s) 8-9, wherein the instructions further cause the one or more processors to receive the selection of the feature by: receiving the selection of the bounding box on the overlay from the user.

Example 11 is the measurement device of example(s) 8-10, wherein the instructions further cause the one or more processors to: identify a portion of the bounding box that has been measured in previous point measurements; output, to the user, a notification of the previously measured portion in the bounding box; receive, from the user, another selection of the bounding box; and in response to receiving the other selection, perform the point measurements of the portion of the environment associated with the feature based on the bounding box.

Example 12 is the measurement device of example(s) 8-11, wherein the instructions further cause the one or more processors to perform the point measurements of the portion of the environment associated with the desired feature by: identifying a resolution associated with a type of the desired feature; determining the portion of the environment to measure based on the bounding box; and performing the point measurements for the portion of the environment using the resolution.

Example 13 is the measurement device of example(s) 8-12, wherein the portion of the environment comprises a region associated with the desired feature outlined by the bounding box and a buffer region surrounding the desired feature, wherein a thickness of the buffer region is selected by the user.

Example 14 is the measurement device of example(s) 8-13, wherein the image segmentation model is a trained machine learning model.

Example 15 is a computer-readable medium comprising instructions that, when executed by one or more processors, perform the following steps: detecting an image of an environment; inputting the image of the environment into an image segmentation model, the image segmentation model configured to identify a plurality of features in the environment present in the image; determining, based on an output from the image segmentation model, a plurality of bounding boxes, each bounding box of the plurality of bounding boxes outlining a feature of the plurality of features and determined based on a plurality of pixels in the image at a boundary of the feature; presenting an identification of the plurality of features for display to a user; receiving a selection of a desired feature of the plurality of features from the user; and performing point measurements of a portion of the environment associated with the desired feature based on a bounding box of the plurality of bounding boxes associated with the desired feature, wherein features in the environment not selected by the user are not included in the point measurements.

Example 16 is the computer-readable medium of example(s) 15, wherein the instructions further cause the one or more processors to present the identification of the plurality of features for display to the user by: presenting the image of the environment for display to the user; and presenting an overlay of the plurality of bounding boxes over the display of the image of the environment to the user.

Example 17 is the computer-readable medium of example(s) 15-16, wherein the instructions further cause the one or more processors to receive the selection of the desired feature by: receiving the selection of the bounding box on the overlay from the user.

Example 18 is the computer-readable medium of example(s) 15-17, wherein the instructions further cause the one or more processors to: identify a portion of the bounding box that has been measured in a previous point measurements; output, to the user, a notification of the previously measured portion in the bounding box; receive, from the user, another selection of the bounding box; and in response to receiving the other selection, perform the point measurements of the portion of the environment associated with the feature based on the bounding box.

Example 19 is the computer-readable medium of example(s) 15-18, wherein the instructions further cause the one or more processors to perform the point measurements of the portion of the environment associated with the desired feature by: identifying a resolution associated with a type of the desired feature; determining the portion of the environment to measure based on the bounding box; and performing the point measurements for the portion of the environment using the resolution.

Example 20 is the computer-readable medium of example(s) 15-19, wherein the portion of the environment comprises a region associated with the desired feature outlined by the bounding box and a buffer region surrounding the desired feature, wherein a thickness of the buffer region is selected by the user.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

FIG. 4 illustrates a flowchart of an embodiment of a process for performing image segmentation by a measurement device.

FIG. 5 illustrates a flowchart of an embodiment of a process for performing image segmentation for previously scanned features by a measurement device.

Figure 1:
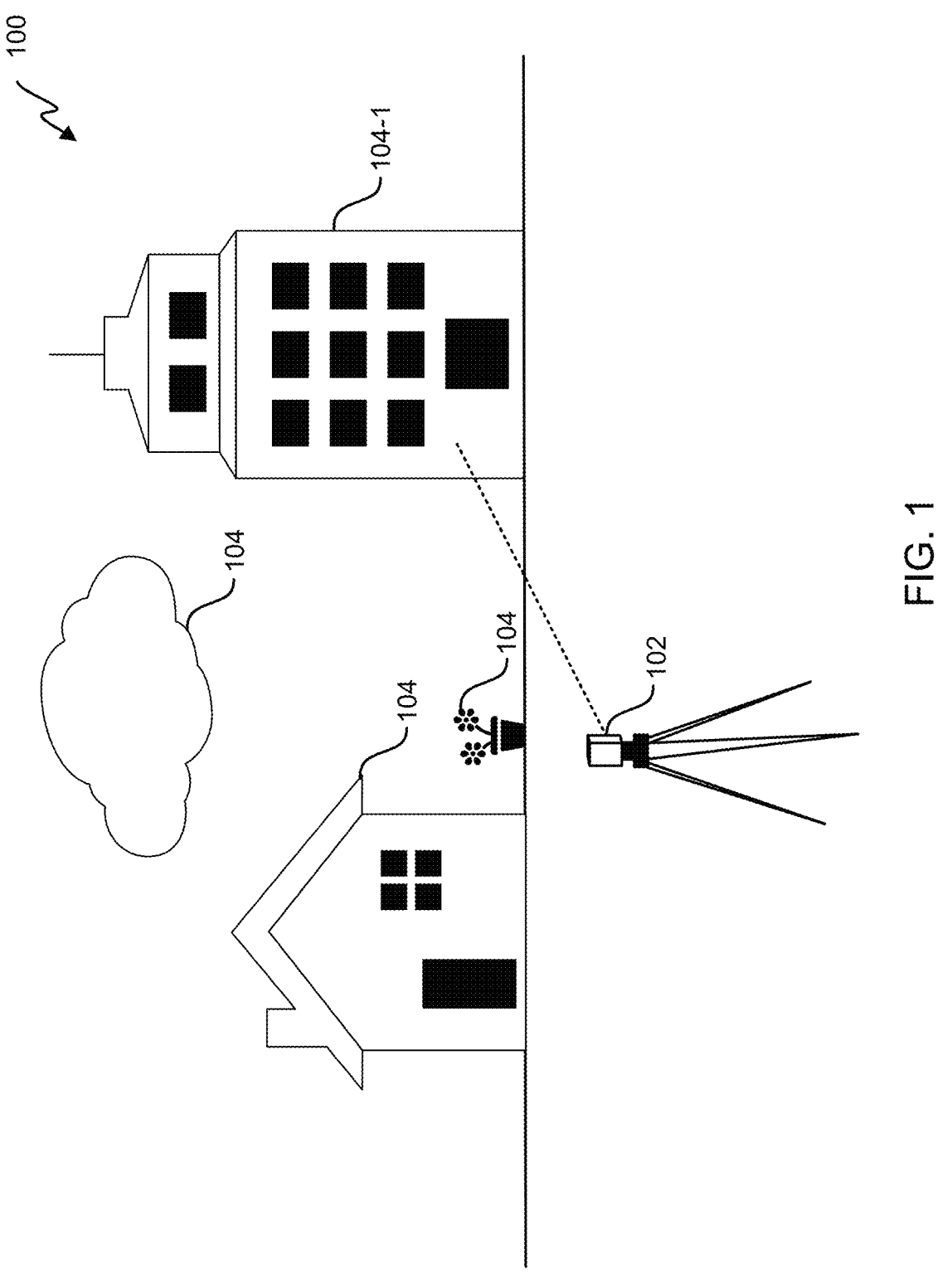
FIG. 1 depicts an embodiment of a system for performing image segmentation for automatic measurement by a measurement device.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

This disclosure relates to integrating image segmentation into measurement devices such as total stations or three-dimensional (3D) scanners. Conventionally, highly skilled and trained surveyors manually identify relevant information for such measurement devices to measure. For instance, to scan a building in an environment, a user can outline a rough polygon outlining the building on an image of the environment. The measurement device can perform point measurements on the building based on the rough polygon. Often, the user may take shortcuts by drawing simple polygons and having the measurement device capture unnecessary information, such as measurements for the sky or vegetation around the building. Or, the user may draw a more accurate polygon to have the measurement device perform quicker and more accurate measurements, but manually drawing accurate polygons may be time consuming.

Embodiments of the present disclosure use image segmentation models to automatically perform point measurements for identified features in an environment. For example, a measurement device such as a total station can obtain an overview panoramic of an environment. The resulting panoramic image can be inputted into an image segmentation model trained to segment and classify visible surroundings (e.g., buildings, roads, vegetation, sky, vehicles, water, bridges, etc.). The image segmentation model can be a computer application or program such as an image application, pattern recognition software, etc. The image segmentation model can be run as software on a computer or as computer hardware. In some embodiments, the image segmentation model can be executed on the measurement device. In other embodiments, the image segmentation model can be executed on an external device in communication with the measurement device. After the image segmentation model provides output identifying types of features in the image to the measurement device, the measurement device can present the image, overlaid with the segmented features, to the user. The user can select one or more of the features to cause the measurement device to automatically perform point measurements of only those features. In some examples, each type of feature can be associated with a different level of customization and resolution. For example, a road can be measured with a low scan density and overview images, while a transmission tower can be measured with a high scan density and telephoto images. Such settings can be set by the user.

Referring first to FIG. 1, an embodiment of a system for performing image segmentation for automatic measurement by a measurement device, such as a robotic total station, is shown. The system comprises a measurement device 102 and various features 104 within an environment 100. The environment 100 is a location (e.g., a three-dimensional space) of interest, such as a neighborhood, construction site, etc.

The measurement device 102 comprises a camera and a measurement system, such as an electronic distance measurement (EDM) unit. In some embodiments, the measurement system is a scanner, such as a laser scanner. In other embodiments, the measurement system is a total station. The features 104 can be environmental features such as a building, a house, vegetation, clouds, etc. Only some of the features 104 may be of interest to be measured.

To perform measurements on only some features 104 in the environment 100, the measurement device 102 can use the camera to capture an image of the environment 100. The image may be a panoramic image, a single image, or a video feed including multiple images. In some examples, the measurement device 102 may automatically capture the image after being set up in the environment 100. The image may be captured by the measurement device 102 before performing point measurements or may be obtained from previous measurement operations. For example, a second measurement device may have previously captured the image of the environment 100 at the same location. The measurement device 102 may obtain the image and perform point measurements based on the image. The image can be inputted into an image segmentation model. In some examples, the image segmentation model may be a machine learning model trained to classify and segment features in an image. The image segmentation model can be executed on the measurement device 102, on a remote computing device within the environment 100 (e.g., on a mobile device of the user), and/or in a remote computing device outside the environment 100 (e.g., on a server in the cloud).

Figure 2:
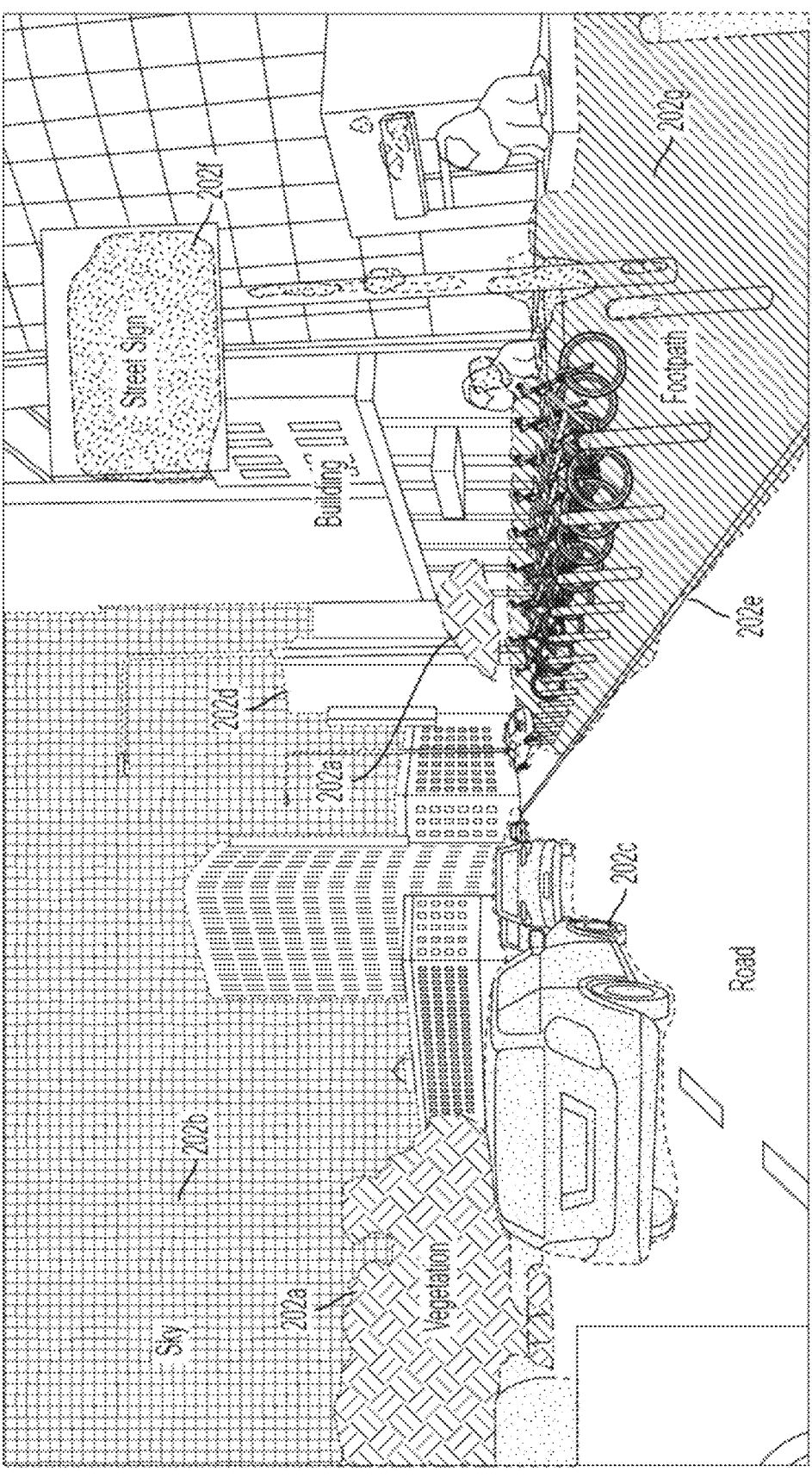
FIG. 2 depicts an embodiment of an image of an environment with segmented features.

The image segmentation model can output identification of the classified features. The measurement device 102 can use the output to identify bounding boxes outlining each classified feature in the image. A bounding box can be a virtual boundary surrounding a type of a feature to distinguish a particular feature from a different feature in proximity. In the embodiment depicted in FIG. 1, the image segmentation model may determine bounding boxes around each of the cloud, the building, the house, the sky, and the vegetation. An example of such a bounding box may surround the boundaries of the house to distinguish the portion of the image including the house from the portion of the image including the sky or the ground. The measurement device 102 can display the bounding boxes to the user. One example of such a display is depicted in FIG. 2.

Still referring to FIG. 1, the user can select one or more of the displayed features 104, such as the building 104-1. The measurement device 102 can then automatically perform point measurements of the building 104-1, without performing point measurements of the cloud, the house, the sky, or the vegetation. The point measurements can be performed for the portion of the environment 100 outlined by the bounding boxes that were identified by the image segmentation model and without requiring outlining by a user. For example, the measurement device 102 may determine the pixel boundaries of the feature identified on the image based on the bounding box to create a polygon. The measurement device 102 can use the polygon to determine a region of the environment to measure. In an embodiment where the measurement device 102 is a scanner, the scanner can perform a stationary scan operation to register point cloud data for the building 104-1.

In some embodiments, such as ones where the measurement device 102 is a total station, the user may select portions of the image before the image is inputted into the image segmentation model. For example, the image may depict a building with windows. The user may interact with a display of the measurement device 102 to select a corner of a window. This selection can indicate the user's interest in the window feature. The image, along with the user selection, can be inputted into the image segmentation model. The image segmentation model can be trained to identify features associated with relevant points or regions identified by users. Thus, the image segmentation model can identify the rest of the window using the identified corner. The measurement device 102 can determine a bounding box defining the window region based on identification output by the image segmentation model. Then, the user can select the window feature and the measurement device 102 can perform point measurements for the window. If the window was the only feature selected by the user, the measurement device 102 may perform point measurements only for the window and may not perform point measurements for other features in the image such as the rest of the building or other windows on the building.

In another example, the image may depict a road with a line (e.g., pavement markings) that bisects the road. The user may select a single point on the line. After receiving the image and the user input, the image segmentation model can identify the rest of the line using the single point. The measurement device 102 may display a bounding box defining the line based on the identification from the image segmentation model. Then, the user can select the line and the measurement device 102 can perform point measurements for the line. If the line was the only feature selected by the user, the measurement device 102 may perform point measurements only for the line and may not perform point measurements for other features in the image such as for the rest of the road.

FIG. 2 depicts an embodiment of an image 200 of an environment with segmented features 202*a-g*. Indication of the segmented features 202*a-g* may be output by an image segmentation model trained to identify features in an environment. The image segmentation model can segment types of features, such as vegetation 202*a*, that may be found in multiple portions of the image 200. Each segmented feature 202 can be defined with a bounding box outlining the bounds of the feature. A display of the measurement device 102 can present the image 200 along with an overlay of the bounding boxes over the display of the image 200 of the environment to the user. The overlay can be a computer rendered boundary used to segment the different types of features 202*a-g*. For example, as depicted in FIG. 2, the bounding boxes can be depicted by dotted line overlays and different types of shading that each correspond to a type of feature 202*a-g*. In other examples, the overlay may include any other indication of differentiated segments, such as differing colors, lines, shading, markings, symbols, etc. Alternatively or additionally, the measurement device 102 can display a list of features 202*a-g* identified by the image segmentation model. The user may interact with the display to select one or more segmented features 202*a-g* to measure. For example, the user may select a bounding box, a feature outlined by a bounding box, or a listed feature to input a selection.

In some embodiments, each type of segmented feature 202*a-g* can be associated with a particular resolution that can be set by a user. For example, the measurement device 102 may be configured to perform point measurements with relatively low resolution for features such as the road 202*e*, and may be configured to perform point measurements with relatively high resolution for features such as the buildings 202*d*. Other parameters can also vary between types of features. In some embodiments, resolution and other settings may be previously defined such that measurement operations can be quickly and automatically performed in the field with minimal user input. An example of a parameter (e.g., width of a buffer region for a bounding box) is depicted in FIG. 3.

Figure 3:
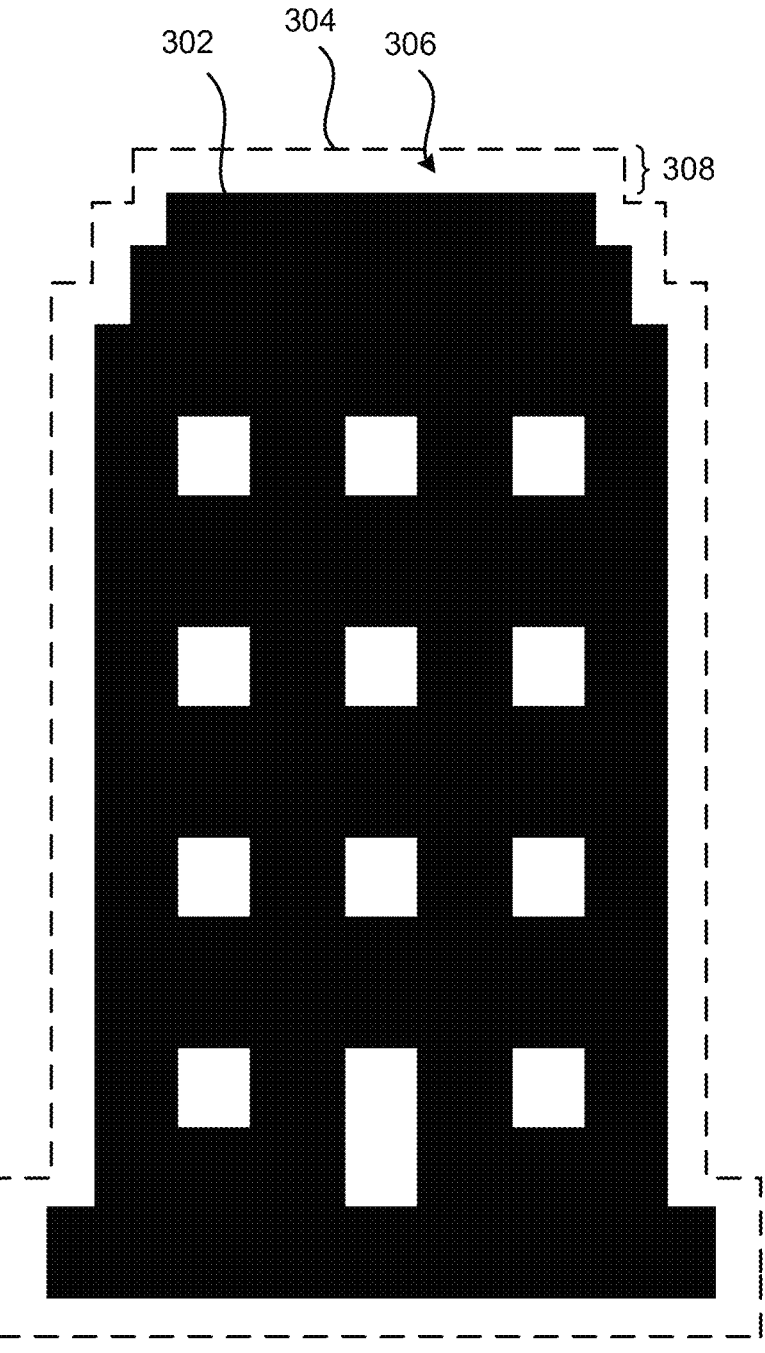
FIG. 3 depicts an embodiment of a bounding box around a feature.

FIG. 3 depicts an embodiment of a bounding box 304 around a feature 302 identified by an image segmentation model. The bounding box 304 may not exactly define the outer limits of the feature. Instead, the bounding box may include the feature as well as a buffer region 306 surrounding the feature 302. The buffer region 306 may have a width 308 that can be set by a user. Including the buffer region 306 within the bounding box 304 can allow for more accurate point measurements for features that may not, for example, have clearly defined edges. In some embodiments, the user may set a relatively large width 308 to ensure that all portions of the feature 302 are measured by the measurement device 102.

FIG. 4 illustrates a flowchart of an embodiment of a process for performing image segmentation by a measurement device. Process 400 begins in step 410 with a measurement device detecting an image of an environment. The image can be detected, for example, by a camera device. In some examples, the measurement device may present the image for display to a user. The user may make an initial selection of a point or region on the image. In step 420, the measurement device inputs the image of the environment into an image segmentation model. The image segmentation model can identify a plurality of features in the environment present in the image. In some examples, the image segmentation model can be a trained machine learning model. If the user provided initial input selecting a point or region on the image, the trained machine learning model may identify features on or near the point or region.

In step 430, the measurement device determines, based on output from the image segmentation model, a plurality of bounding boxes. Each bounding box can outline a feature in the environment. Each bounding box can be determined based on pixels in the image at a boundary of the feature. In some embodiments, based on user input, some or all of the bounding boxes may outline a feature as well as a buffer region surrounding the feature. Thickness of the buffer region can be selected by the user. In step 440, the measurement device can present an identification of the features for display to the user. In some embodiments, the measurement device can present the image of the environment for display to the user. Additionally, the measurement device can present an overlay of the bounding boxes over the display of the image of the environment to the user.

In step 450, the measurement device receives a selection of a desired feature from the user. In some embodiments, the measurement device may display the image and the bounding boxes as the overlay on a touchscreen display. The measurement device may receive the selection by registering a touch selection of a bounding box by the user. Or, the user may select a desired feature from a list of desired features identified with or without the bounding boxes. In step 460, the measurement device performs point measurements of a portion of the environment associated with the desired feature based on the bounding box associated with the desired feature. Features in the environment not selected by the user are not included in the point measurements.

FIG. 5 illustrates a flowchart of an embodiment of a process 500 for performing image segmentation for previously scanned features by a measurement device. Process 500 begins in step 510 with a measurement device identifying a portion of a bounding box that has been measured in previous point measurements. The bounding box may be received from an image segmentation model and may outline a feature. The measurement device may determine that some or all of the associated feature has been measured by the same measurement device or a different measurement device, such as by accessing a database of previous point measurements for the environment.

In step 520, the measurement device outputs a notification of the previously measured portion in the bounding box to the user. For example, the measurement device may output an overlay highlighting the previously measured portion. This can indicate to the user that the portion has already been measured to prevent unnecessary scanning. In step 530, the measurement device receives, from the user, a selection. In step 540, the measurement device determines whether the selection indicates that the previously measured portion should be measured again. If the selection indicates that the previously measured portion should be scanned again, the process 500 continues to step 550. If the selection indicates that the previously measured portion should not be scanned again, the process 500 continues to step 560.

In step 550, the measurement device performs point measurements of the portion of the environment associated with the feature based on the bounding box. The user may select the same bounding box to perform a more accurate measurement of the feature, or because it is acceptable to scan the feature again. In step 560, the measurement device performs point measurements on another portion of the bounding box that has not been previously measured. The measurement device may not perform point measurements for the portion that has previously been measured. This can allow for quicker and more efficient measurement in the field.

Figure 6:
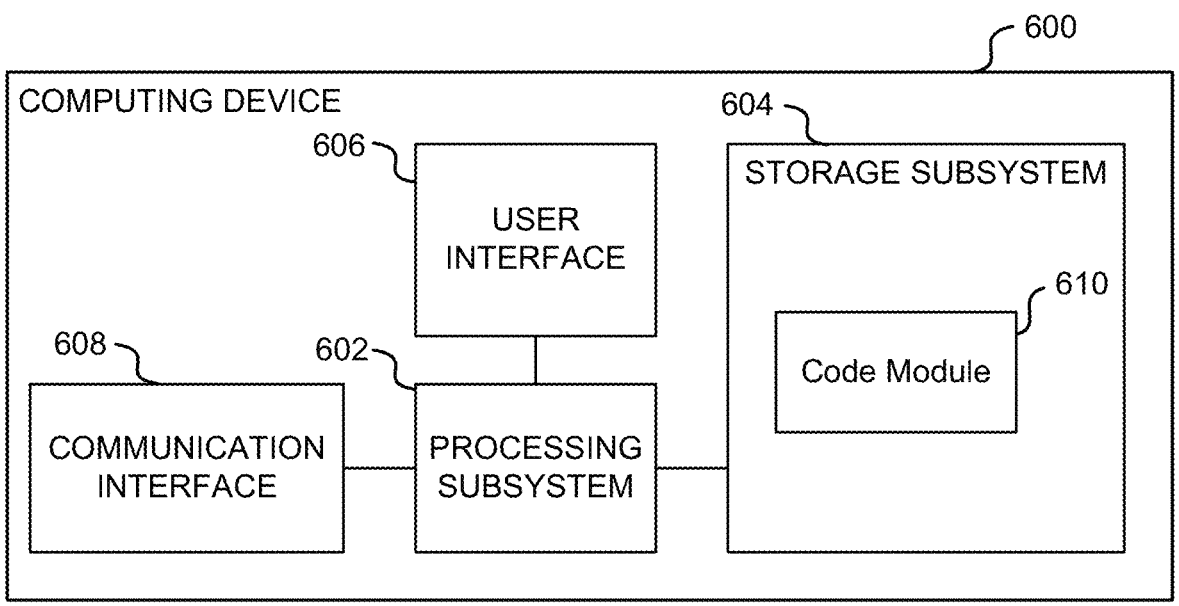
FIG. 6 depicts a block diagram of an embodiment of a computer system.

FIG. 6 is a simplified block diagram of a computing device 600. Computing device 600 can implement some or all functions, behaviors, and/or capabilities described above that would use electronic storage or processing, as well as other functions, behaviors, or capabilities not expressly described. Computing device 600 includes a processing subsystem 602, a storage subsystem 604, a user interface 606, and/or a communication interface 608. Computing device 600 can also include other components (not explicitly shown) such as a battery, power controllers, and other components operable to provide various enhanced capabilities. In various embodiments, computing device 600 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 604 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 604 can store one or more applications and/or operating system programs to be executed by processing subsystem 602, including programs to implement some or all operations described above that would be performed using a computer. For example, storage subsystem 604 can store one or more code modules 610 for implementing one or more method steps described above.

A firmware and/or software implementation may be implemented with modules (e.g., procedures, functions, and so on). A machine-readable medium tangibly embodying instructions may be used in implementing methodologies described herein. Code modules 610 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 610) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 610 may comprise sets of instructions (codes) embodied on a computer-readable medium that directs a processor of a computing device 600 to perform corresponding actions. The instructions may be configured to run in sequential order, in parallel (such as under different processing threads), or in a combination thereof. After loading a code module 610 on a general purpose computer system, the general purpose computer is transformed into a special purpose computer system.

Computer programs incorporating various features described herein (e.g., in one or more code modules 610) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 604 can also store information useful for establishing network connections using the communication interface 608.

User interface 606 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 606 to invoke the functionality of computing device 600 and can view and/or hear output from computing device 600 via output devices of user interface 606. For some embodiments, the user interface 606 might not be present (e.g., for a process using an ASIC).

Processing subsystem 602 can be implemented as one or more processors (e.g., integrated circuits, one or more single-core or multi-core microprocessors, microcontrollers, central processing unit, graphics processing unit, etc.). In operation, processing subsystem 602 can control the operation of computing device 600. In some embodiments, processing subsystem 602 can execute a variety of programs in response to program code and can maintain multiple concurrently executing programs or processes. At a given time, some or all of a program code to be executed can reside in processing subsystem 602 and/or in storage media, such as storage subsystem 604. Through programming, processing subsystem 602 can provide various functionality for computing device 600. Processing subsystem 602 can also execute other programs to control other functions of computing device 600, including programs that may be stored in storage subsystem 604.

Communication interface 608 can provide voice and/or data communication capability for computing device 600. In some embodiments, communication interface 608 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 608 can provide wired connectivity (e.g., universal serial bus, Ethernet, universal asynchronous receiver/transmitter, etc.) in addition to, or in lieu of, a wireless interface. Communication interface 608 can be implemented using a combination of hardware (e.g., driver circuits, antennas, modulators/demodulators, encoders/decoders, and other analog and/or digital signal processing circuits) and software components. In some embodiments, communication interface 608 can support multiple communication channels concurrently. In some embodiments, the communication interface 608 is not used.

It will be appreciated that computing device 600 is illustrative and that variations and modifications are possible. A computing device can have various functionality not specifically described (e.g., voice communication via cellular telephone networks) and can include components appropriate to such functionality.

Further, while the computing device 600 is described with reference to particular blocks, it is to be understood that these blocks are defined for convenience of description and are not intended to imply a particular physical arrangement of component parts. For example, the processing subsystem 602, the storage subsystem 604, the user interface 606, and/or the communication interface 608 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 600.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. A method for operating a measurement device, the method comprising:

detecting, by the measurement device, an image of an environment;

inputting, by the measurement device, the image of the environment into an image segmentation model, the image segmentation model configured to identify a plurality of features in the environment present in the image;

determining, by the measurement device based on an output from the image segmentation model, a plurality of bounding boxes, each bounding box of the plurality of bounding boxes outlining a feature of the plurality of features in the environment and determined based on a plurality of pixels in the image at a boundary of the feature;

presenting, by the measurement device, an identification of the plurality of features for display to a user, including:

presenting, by the measurement device, the image of the environment for display to the user; and presenting, by the measurement device, an overlay of the plurality of bounding boxes over the display of the image of the environment to the user;

receiving, by the measurement device, a selection of a desired feature of the plurality of features from the user; and performing, by the measurement device, point measurements of a portion of the environment associated with the desired feature based on a bounding box of the plurality of bounding boxes associated with the desired feature, wherein features in the environment not selected by the user are not included in the point measurements.

2. The method of claim 1, wherein receiving the selection of the desired feature further comprises:

receiving, by the measurement device, the selection of the bounding box on the overlay from the user.

3. The method of claim 1, further comprising:

identifying, by the measurement device, a portion of the bounding box that has been measured in previous point measurements;

outputting, to the user, a notification of the previously measured portion in the bounding box;

receiving, from the user, another selection of the bounding box; and in response to receiving the other selection, performing, by the measurement device, the point measurements of the portion of the environment associated with the feature based on the bounding box.

4. The method of claim 1, wherein performing the point measurements of the portion of the environment associated with the desired feature further comprises:

identifying, by the measurement device, a resolution associated with a type of the desired feature;

determining, by the measurement device, the portion of the environment to measure based on the bounding box; and performing, by the measurement device, the point measurements for the portion of the environment using the resolution.

5. The method of claim 1, wherein the portion of the environment comprises a region associated with the desired feature outlined by the bounding box and a buffer region surrounding the desired feature, wherein a thickness of the buffer region is selected by the user.

6. The method of claim 1, wherein the image segmentation model is a trained machine learning model.

7. A measurement device for performing point measurements, the measurement device comprising:

one or more memory devices coupled with the measurement device containing instructions that, when executed by one or more processors, perform the following steps:

detecting an image of an environment;

inputting the image of the environment into an image segmentation model, the image segmentation model configured to identify a plurality of features in the environment present in the image;

determining, based on an output from the image segmentation model, a plurality of bounding boxes, each bounding box of the plurality of bounding boxes outlining a feature of the plurality of features in the environment and determined based on a plurality of pixels in the image at a boundary of the feature;

presenting an identification of the plurality of features for display to a user, including:

presenting the image of the environment for display to the user; and presenting an overlay of the plurality of bounding boxes over the display of the image of the environment to the user;

receiving a selection of a desired feature of the plurality of features from the user; and performing point measurement of a portion of the environment associated with the desired feature based on a bounding box of the plurality of bounding boxes associated with the desired feature, wherein features in the environment not selected by the user are not included in the point measurements.

8. The measurement device of claim 7, wherein the instructions further cause the one or more processors to receive the selection of the feature by:

receiving the selection of the bounding box on the overlay from the user.

9. The measurement device of claim 7, wherein the instructions further cause the one or more processors to:

identify a portion of the bounding box that has been measured in previous point measurements;

output, to the user, a notification of the previously measured portion in the bounding box;

receive, from the user, another selection of the bounding box; and in response to receiving the other selection, perform the point measurements of the portion of the environment associated with the feature based on the bounding box.

10. The measurement device of claim 7, wherein the instructions further cause the one or more processors to perform the point measurements of the portion of the environment associated with the desired feature by:

identifying a resolution associated with a type of the desired feature;

determining the portion of the environment to measure based on the bounding box; and performing the point measurements for the portion of the environment using the resolution.

11. The measurement device of claim 7, wherein the portion of the environment comprises a region associated with the desired feature outlined by the bounding box and a buffer region surrounding the desired feature, wherein a thickness of the buffer region is selected by the user.

12. The measurement device of claim 7, wherein the image segmentation model is a trained machine learning model.

13. A non-transitory computer-readable medium comprising instructions that, when executed by one or more processors, perform the following steps:

detecting an image of an environment;

inputting the image of the environment into an image segmentation model, the image segmentation model configured to identify a plurality of features in the environment present in the image;

determining, based on an output from the image segmentation model, a plurality of bounding boxes, each bounding box of the plurality of bounding boxes outlining a feature of the plurality of features and determined based on a plurality of pixels in the image at a boundary of the feature;

presenting an identification of the plurality of features for display to a user, including:

presenting the image of the environment for display to the user; and presenting an overlay of the plurality of bounding boxes over the display of the image of the environment to the user;

receiving a selection of a desired feature of the plurality of features from the user; and performing point measurements of a portion of the environment associated with the desired feature based on a bounding box of the plurality of bounding boxes associated with the desired feature, wherein features in the environment not selected by the user are not included in the point measurements.

14. The non-transitory computer-readable medium of claim 13, wherein the instructions further cause the one or more processors to receive the selection of the desired feature by:

receiving the selection of the bounding box on the overlay from the user.

15. The non-transitory computer-readable medium of claim 13, wherein the instructions further cause the one or more processors to:

identify a portion of the bounding box that has been measured in a previous point measurements;

output, to the user, a notification of the previously measured portion in the bounding box;

receive, from the user, another selection of the bounding box; and in response to receiving the other selection, perform the point measurements of the portion of the environment associated with the feature based on the bounding box.

16. The non-transitory computer-readable medium of claim 13, wherein the instructions further cause the one or more processors to perform the point measurements of the portion of the environment associated with the desired feature by:

identifying a resolution associated with a type of the desired feature;

determining the portion of the environment to measure based on the bounding box; and performing the point measurements for the portion of the environment using the resolution.

17. The non-transitory computer-readable medium of claim 13, wherein the portion of the environment comprises a region associated with the desired feature outlined by the bounding box and a buffer region surrounding the desired feature, wherein a thickness of the buffer region is selected by the user.

\* \* \* \* \*